United States Patent
Pasupathy et al.

(10) Patent No.: US 7,260,576 B2
(45) Date of Patent: Aug. 21, 2007

(54) IMPLEMENTING A DISTRIBUTED FILE SYSTEM THAT CAN USE DIRECT CONNECTIONS FROM CLIENT TO DISK

(75) Inventors: Shankar Pasupathy, Sunnyvale, CA (US); Amod K. Dani, Santa Clara, CA (US); Sushil Thomas, San Francisco, CA (US); Siamak Nazari, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 456 days.

(21) Appl. No.: 10/288,153

(22) Filed: Nov. 5, 2002

(65) Prior Publication Data

US 2004/0088288 A1 May 6, 2004

(51) Int. Cl.
*G06F 17/30* (2006.01)
(52) U.S. Cl. .............................. 707/10; 707/3; 709/217
(58) Field of Classification Search ................. 707/10, 707/3; 711/3, 100, 112, 221; 709/217
See application file for complete search history.

(56) References Cited

U.S. PATENT DOCUMENTS 6,286,080 B1* 9/2001 Galbraith et al. ........... 711/113
2002/0078239 A1* 6/2002 Howard et al. ............. 709/245

* cited by examiner

*Primary Examiner*—Paul Rodriguez
*Assistant Examiner*—Luke Osborne
(74) *Attorney, Agent, or Firm*—Park, Vaughn & Fleming, LLP

(57) ABSTRACT

One embodiment of the present invention provides a distributed file system that is able to use direct connections between clients and disks to perform file system operations. Upon receiving a request at a client to access a file, the client performs a lookup in a local cache to determine what physical disk blocks are associated with the request. If the lookup cannot be satisfied from the local cache, the client forwards the request to a server. In response to the forwarded request, the client receives a block map for the file from the server. This block map includes location information specifying physical disk blocks containing the file. The client uses this block map to determine which physical disk blocks are involved in the request and then accesses the file directly from the disk without going through the server.

18 Claims, 4 Drawing Sheets

IMPLEMENTING A DISTRIBUTED FILE SYSTEM THAT CAN USE DIRECT CONNECTIONS FROM CLIENT TO DISK

BACKGROUND

1. Field of the Invention

The present invention relates to distributed file systems. More specifically, the present invention relates to a method and an apparatus for implementing a distributed file system that is able to bypass a file server and instead use direct connections between clients and disks to perform file system operations.

2. Related Art

Distributed file systems are typically based on a client-server model, wherein a client wishing to access a file sends a request to a server to Upon receiving a request, the server accesses the underlying file system to perform the operation on the file. For example, if the request is to for a read operation, the server communicates with the underlying file system to locate the file and read the data from the file. During this process, the server translates a file identifier and an offset into identifiers for the physical disk blocks where the file is stored. The server then requests the disk blocks from one or more disk drives that contain the disk blocks. After the requested data is retrieved from the disk drives, the server forwards the data to the client that initiated the read request. A similar process takes place during a write operation, except that the data goes in the opposite direction.

This client-server model works well for systems that support a small number of clients that generate a small volume of requests. However, systems that support larger numbers of clients that generate a large volume of requests can potentially suffer from a bottleneck at the server. Such a bottleneck can dramatically increase the server's response time and can make accesses to the distributed file system unacceptably slow.

As computer networks provide additional connectivity, there often exists alternative pathways that connect a client with a disk drive containing a file without running through the server. However, these alterative pathways cannot be used by existing distributed file systems, because existing distributed file systems rely on the server to perform translations between file access requests and disk block identifiers. Hence, the server remains a bottleneck in such distributed file systems.

What is needed is a method and an apparatus that uses additional communication pathways between clients and disk drives to alleviate the performance bottleneck caused by routing all distributed file system operations through a server.

SUMMARY

One embodiment of the present invention provides a distributed file system that is able to use direct connections between clients and disks to perform file system operations. Upon receiving a request at a client to access a file, the client performs a lookup in a local cache to determine what physical disk blocks are associated with the request. If the lookup cannot be satisfied from the local cache, the client forwards the request to a server. In response to the forwarded request, the client receives a block map for the file from the server. This block map includes location information specifying physical disk blocks containing the file. The client uses this block map to determine which physical disk blocks are involved in the request and then accesses the file directly from the disk without going through the server.

In one embodiment of the present invention, the block map includes only a portion of the location information for the file.

In one embodiment of the present invention, if the request to access the file is a read request, the system prefetches additional portions of the block map as they are needed.

In one embodiment of the present invention, if the request to access the file is a write request, the system causes the server to invalidate outstanding block maps for the file on other clients and grants an exclusive block map to the client that initiated the write request.

In one embodiment of the present invention, the system invalidates the exclusive block map prior to accepting a read request for the file.

In one embodiment of the present invention, the underlying file system includes a UNIX® file system. UNIX is a registered trademark of The Open Group in the US and other countries.

In one embodiment of the present invention, the underlying file system does not reorder blocks so that the block map remains correct after the block map has been received from the server.

In one embodiment of the present invention, if a direct path between the client and the disk does not exist, the system sends all requests associated with the disk through the server via an independent port, such as a cluster interconnect.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general, principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed File System

Figure 1:
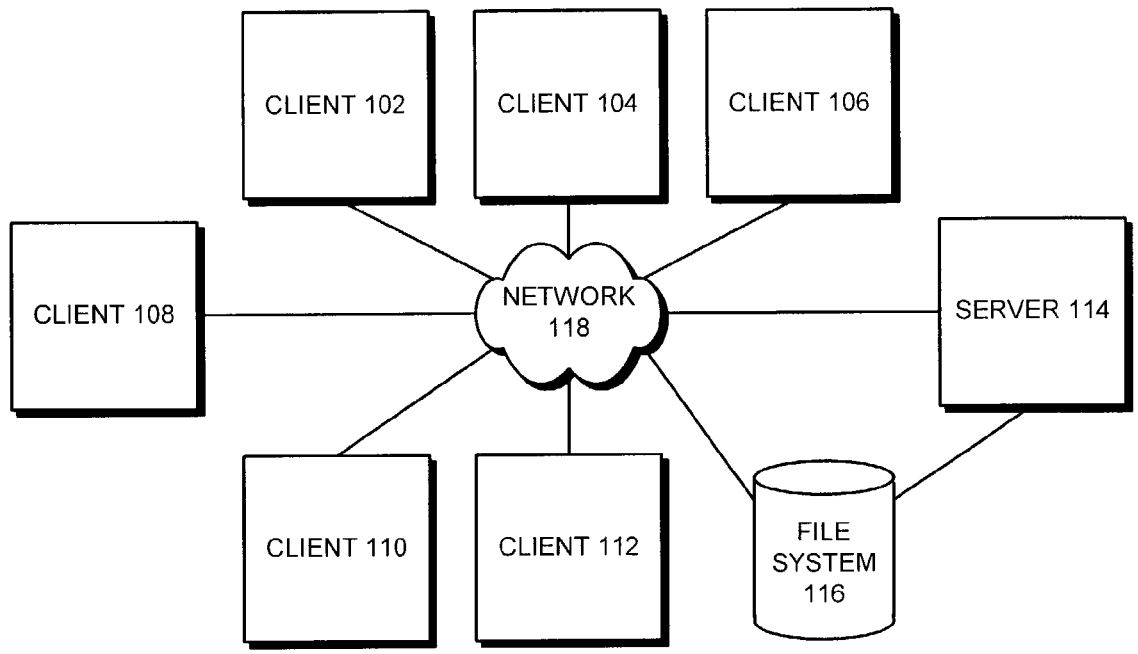
FIG. 1 illustrates a distributed file system in accordance with an embodiment of the present invention.

FIG. 1 illustrates a distributed file system in accordance with an embodiment of the present invention. This distributed file system includes clients 102, 104, 106, 108, 110, and 112, which are coupled to server 114 and file system 116 through network 118.

Clients 102, 104, 106, 108, 110, and 112 can generally include any node on a network including computational capability and including a mechanism for communicating across network 118. Server 114 can generally include any node including a mechanism for servicing requests from clients 102, 104, 106, 108, 110, and 112 for computational and/or data storage resources.

File system 116 can include any type of system for storing data in non-volatile storage. This includes, but is not limited to, systems based upon magnetic, optical, and magneto-optical storage devices, as well as storage devices based on flash memory and/or battery-backed up memory.

Network 118 can generally include any type of wire or wireless communication channel capable of coupling together computing nodes. This includes, but is not limited to, a local area network, a wide area network, or a combination of networks. In one embodiment of the present invention, network 118 includes a storage area network (SAN).

During operation, clients wishing to access a file located on file system 116 send a request to server 114 across network 118. Server 114 then accesses file system 116 to locate the file and to determine the block locations where the file is stored within file system 116. Server 114 then provides a block map (or a portion of a block map) of the file blocks to the requesting client. This block map indicates which blocks within file system 116 are associated with the file access request. More specifically, the block map contains translations from file offsets and lengths into corresponding disk block numbers and lengths.

The client can then directly access file system 116 using data from the block map to locate the file blocks. Note that allowing the clients to directly access file system 116 greatly reduces the traffic through server 114 and can thereby alleviate a bottleneck through server 114.

Client

Figure 2:
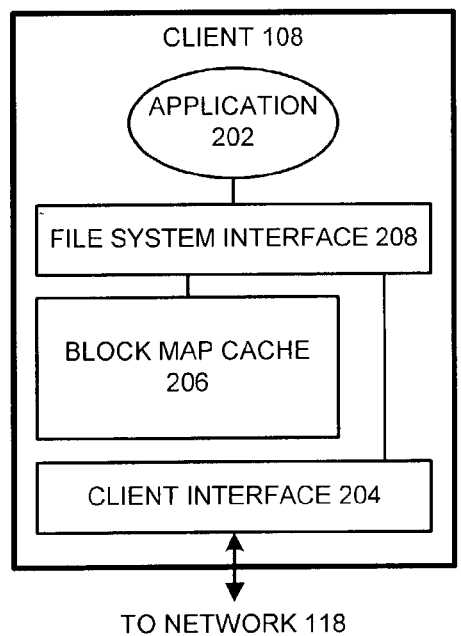
FIG. 2 illustrates a client in accordance with an embodiment of the present invention.

FIG. 2 illustrates a client 108 in accordance with an embodiment of the present invention. Client 108 contains application 202, client interface 204, block map cache 206, and file system interface 208.

Application 202 can be any application executing on client 108 that makes accesses to file system 116. Note that there can be more than one applications executing on client 108 and each of these applications can make accesses to one or more files located on file system 116.

During operation, application 202 generates a request to access to a file stored on file system 116. Client 108 forwards this request to server 114 through client interface 204. Server 114 responds with a block map of the file as is described below with reference to FIG. 3. Note that the block map may include only a portion of the total block map for the file. If only a portion of the block map is supplied, client 108 can prefetch additional portions of the block map as they are required.

Upon receiving the block map, client 108 stores the block map in block map cache 206 for future reference. Note that block map cache 206 stores block maps or portions of block maps for one or more files that are open on behalf of application 202 and for other applications executing on client 108.

After the block map has been stored in block map cache 206, file system interface 208 on client 108 uses block offsets and block lengths from the block map to directly access file blocks from file system 116. Client 108 can then read and write the file data on file system 116 directly, without having to go through server 114. This reduces traffic through file server 114, and can thereby eliminate a potential performance bottleneck through file server 114.

When the file is subsequently closed by application 202, client 108 notifies server 114 that client 108 is no longer accessing the file. Client 108 also deletes the corresponding block map from block map cache 206.

Note that if a direct path between client 108 and file system 116 does not exist, the system sends all requests associated with file system 116 through server 114 via an independent port, such as a cluster interconnect. In this case, client 108 does not maintain block maps files located on file system 116.

Server

Figure 3:
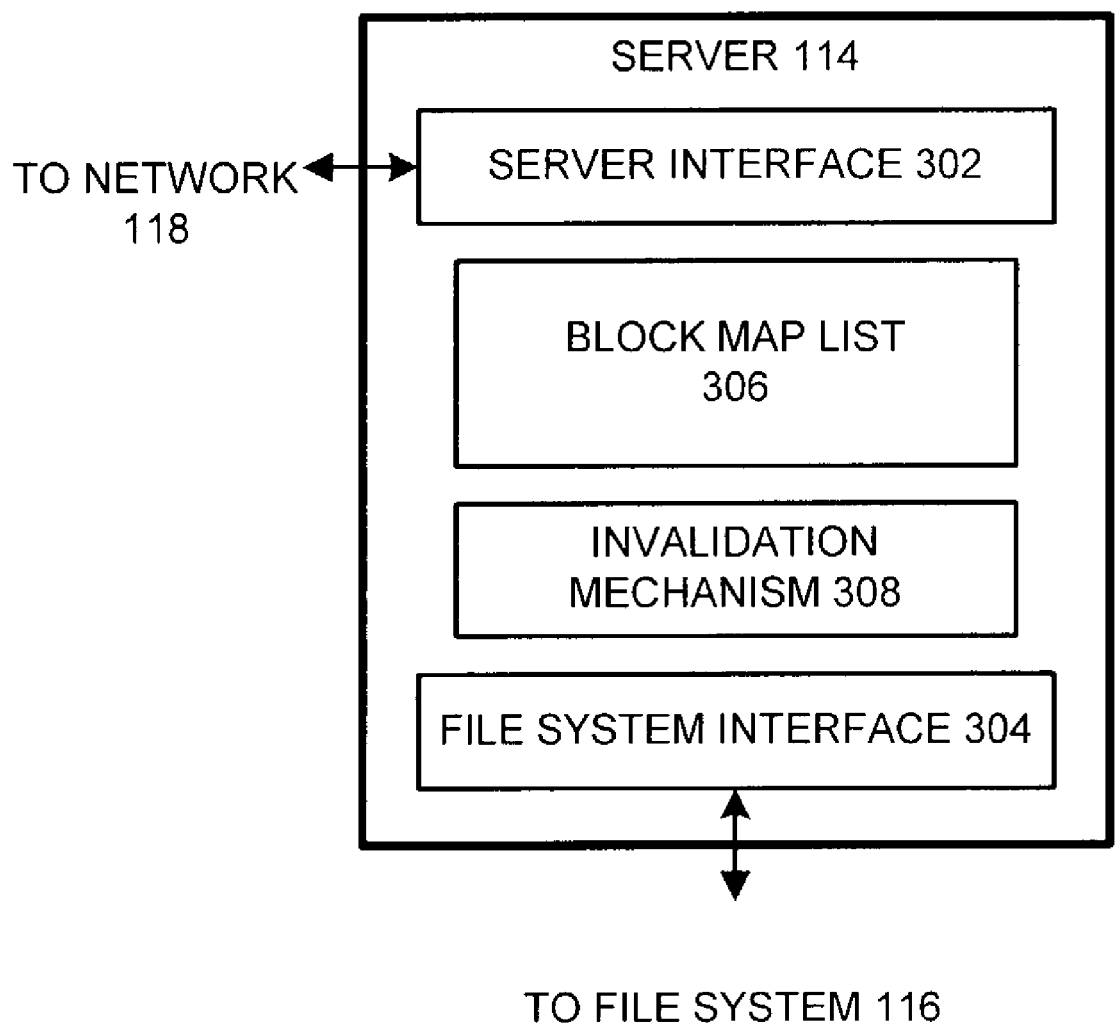
FIG. 3 illustrates a server in accordance with an embodiment of the present invention.

FIG. 3 illustrates server 114 in accordance with an embodiment of the present invention. Server 114 contains server interface 302, file system interface 304, block map list 306, and invalidation mechanism 308.

During operation, server interface 302 receives a request to access a file stored on file system 116 from a client, such as client 108. In response to this request, server 114 retrieves a block map for the file from file system 116 through file system interface 304. This block map specifies the offsets and lengths of the disk blocks that make up the file. Next, server 114 sends this block map to client 108 so that the client 108 can subsequently access the file directly, without having to go through server 114. Note that the complete block map for a file might not be sent during the first access. Instead, the block map can be divided into portions, wherein only the first portion is initially sent to client 108. Client 108 can then prefetch additional portions of the block map as they are required.

Server 114 maintains block map list 306 to keep track of block maps that have been communicated to the clients. When a write request for particular file is received by server 114, server 114 examines block map list 306 to determine if any client currently has read access to the file. If so, invalidation mechanism 308 invalidates the block map for the file and informs associated clients that the block map is invalid. Invalidating the block map in this way prevents a client from writing to a file that is open for read access by another client. This prevents potential data consistency problems. Invalidation mechanism 308 can also be used to invalidate a block map for a client that has exclusive write access to a file prior to allowing the client to perform a read operation to the file.

Client Access to a File

Figure 4:
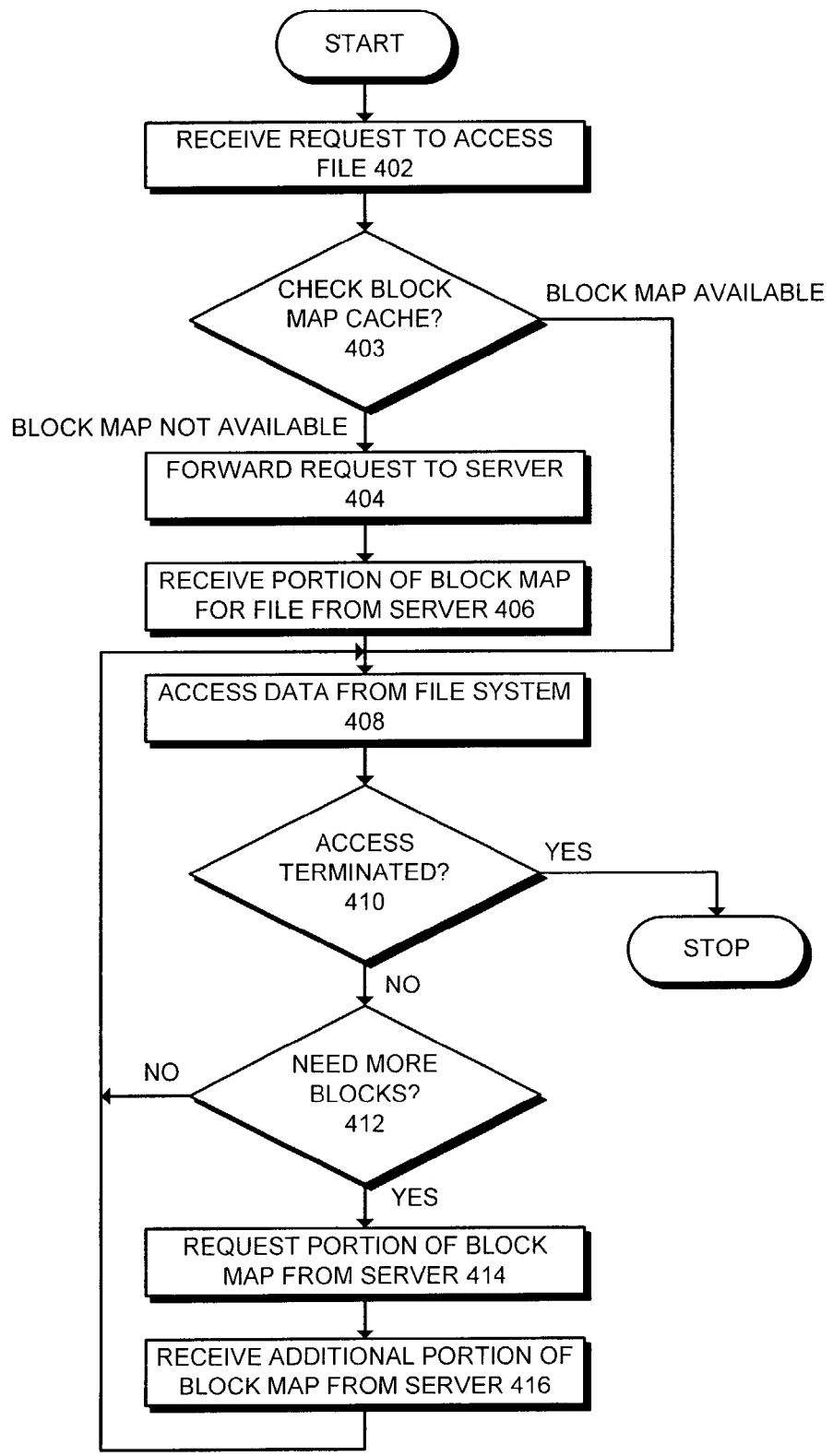
FIG. 4 is a flowchart illustrating the process of a client accessing a file in accordance with an embodiment of the present invention.

FIG. 4 is a flowchart illustrating how client 108 accesses a file in accordance with an embodiment of the present invention. The system starts when client 108 receives a request to access a file from application 202 (step 402). In response to this request, client 108 checks the block map cache 206 to determine if it is necessary to send a request to the server (step 403). If it is necessary, client interface 204 forwards the request to server 114 (step 404). In response to this request, client 108 receives at least a portion of the block map for the file from server 114 (step 406).

After receiving the block map for the file, or if the block map already exists in block map cache 206 at step 403, client 108 accesses the file directly from file system 116 on behalf of application 202 (step 408).

Next, client 108 determines if the file access has been completed by application 202 (step 410). If not, client 108 determines if another portion of the block map needs to be prefetched (step 412). If so, client 108 requests another portion of the block map from server 114 (step 414). In response to this request, client 108 receives an additional portion of the block map for the file from the server (step 416).

If no additionally blocks need to be prefetched at step 412, the process returns to step 408 to access more data from file system 116. If the file access has been completed at step 410, the process stops.

Providing a Block Map

Figure 5:
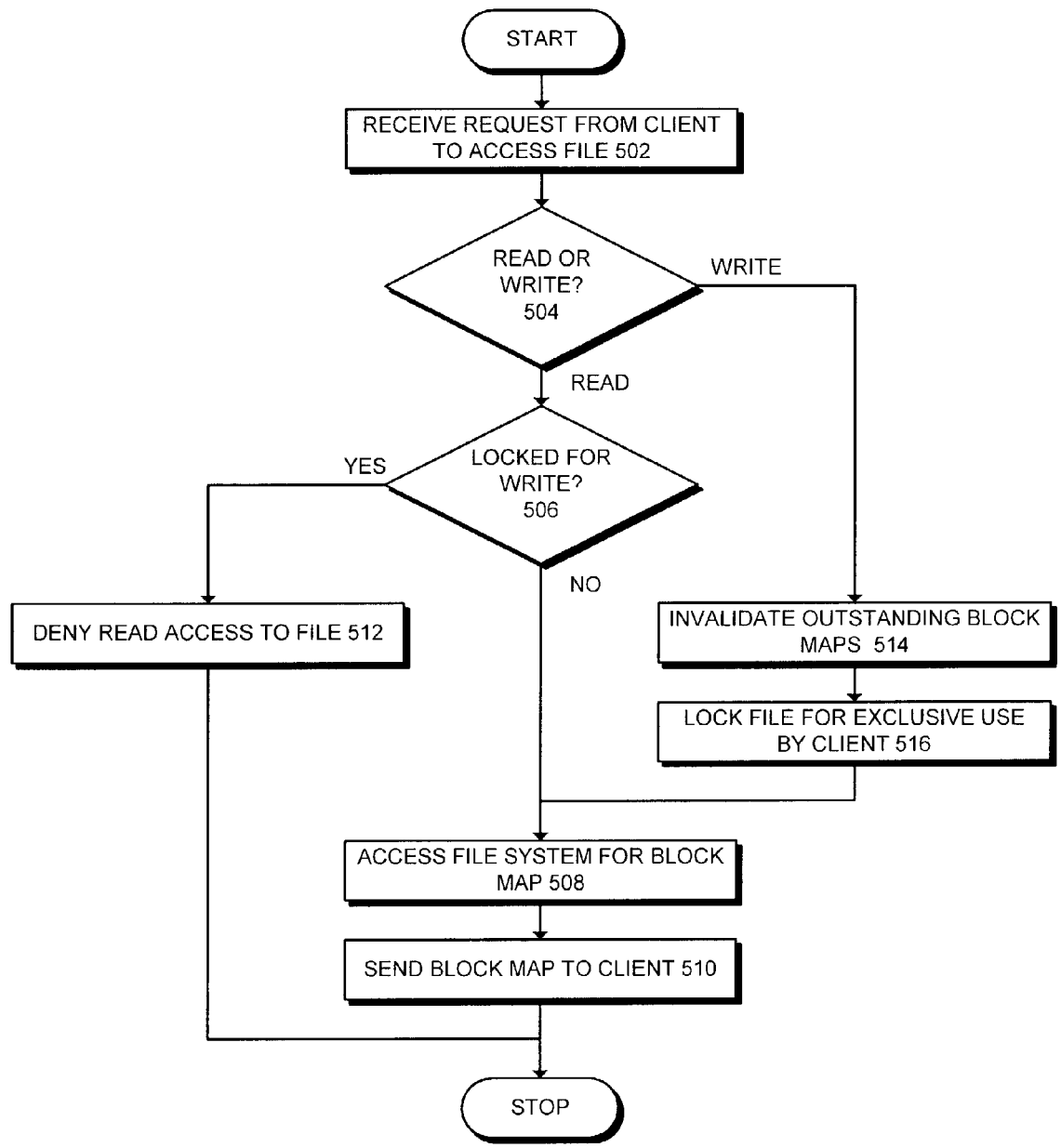
FIG. 5 is a flowchart illustrating the process of a server providing a block map to a client in accordance with an embodiment of the present invention.

FIG. 5 is a flowchart illustrating the process of providing a block map to a client in accordance with an embodiment of the present invention. The process starts when server 114 receives a request from client 108 to access a file (step 502). Next, server 114 determines if the request is for a read operation or a write operation (step 504).

If the request is for a read operation, server 114 determines if another client has the file locked for write access (step 506). If the file is locked for write access, server 114 denies client 108 access to the file and terminates the process (step 512). Alternatively, server 114 can wait for the write operation to complete and can then send a block map for the file to client 108.

If the access request is for a write operation at step 504, server 114 invalidates any outstanding block maps for clients that have may read access to the file (step 514). Next, server 114 locks the file for exclusive write access by client 108 (step 516).

After locking the file for exclusive write access during a write operation at step 516, or if the file is not locked during a read operation at step 506, server 114 accesses file system 116 to obtain a block map for the file (step 508). Next, server 114 returns the block map to client 108, thereby completing the process (step 510). Note that only a portion of the block map may be sent at this time, and additional portions may subsequently be sent in response to additional prefetch requests from the client 108.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for implementing a distributed file system on a storage area network, comprising:
   accepting a request at a client to access a file;
   performing a lookup in a local cache to determine what physical disk blocks are associated with the request; and
   if the lookup cannot be satisfied in the local cache,
      forwarding the request from the client to a server,
      receiving a block map for the file from the server, wherein the block map includes location information specifying physical blocks corresponding to the file,
      maintaining a block map list at the server, wherein the block map list is used to keep track of the block maps that have been communicated to the clients, and wherein if the request to access the file is a write request, the method further comprises using the block map list at the server to:
         cause the server to invalidate outstanding block maps for the file on other clients; and
         grant an exclusive block map to the client that initiated the write request, and
      using information from the block map at the client to access the file on the storage device directly without going through the server, wherein using information from the block map to access the file allows the client to directly access the storage blocks on the storage device;
   wherein if a direct path between the client and the storage device does not exist, the method further comprises sending all requests associated with the storage device from the client through the server to the storage device via an independent port.

2. The method of claim 1, wherein the block map includes only a portion of the location information for the file.

3. The method of claim 2, wherein if the request to access the file is a read request, the method further comprises prefetching additional portions of the block map as they are needed.

4. The method of claim 1, further comprising invalidating the exclusive block map prior to accepting a read request for the file.

5. The method of claim 1, wherein an underlying file system includes a UNIX® file system.

6. The method of claim 5, wherein the underlying file system does not reorder blocks so that the block map remains correct after the block map has been received from the server.

7. A storage device storing instructions that when executed by a computer cause the computer to perform a method for implementing a distributed file system on a storage area network, the method comprising:
   accepting a request at a client to access a file;
   performing a lookup in a local cache to determine what physical disk blocks are associated with the request; and
   if the lookup cannot be satisfied in the local cache,
      forwarding the request from the client to a server,
      receiving a block map for the file from the server, wherein the block map includes location information specifying physical blocks corresponding to the file,
      maintaining a block map list at the server, wherein the block map list is used to keep track of the block maps that have been communicated to the clients, and wherein if the request to access the file is a write request, the method further comprises using the block map list at the server to:
         cause the server to invalidate outstanding block maps for the file on other clients; and
         grant an exclusive block map to the client that initiated the write request, and
      using information from the block map at the client to access the file on the storage device directly without going through the server, wherein using information from the block map to access the file allows the client to directly access the storage blocks on the storage device;
   wherein if a direct path between the client and the storage device does not exist, the method further comprises sending all requests associated with the storage device from the client through the server to the storage device via an independent port.

8. The storage device of claim 7, wherein the block map includes only a portion of the location information for the file.

9. The storage device of claim 8, wherein if the request to access the file is a read request, the method further comprises prefetching additional portions of the block map as they are needed.

10. The storage device of claim 7, the method further comprising invalidating the exclusive block map prior to accepting a read request for the file.

11. The storage device of claim 7, wherein an underlying file system includes a UNIX® file system.

12. The storage device of claim 11, wherein the underlying file system does not reorder blocks so that the block map remains correct after the block map has been received from the server.

13. An apparatus for implementing a file system on a storage area network, comprising:
 a lookup mechanism that is configured to perform a lookup in a local cache to determine what physical disk blocks are associated with a file system request;
 a forwarding mechanism that is configured to forward the request from the client to a server if the lookup cannot be satisfied by the local cache;
 a receiving mechanism that is configured to receive a block map for the file from the server, wherein the block map includes location information specifying physical blocks corresponding to the file;
 a maintaining mechanism that is configured to maintain a block map list at the server, wherein the block map list is used to keep track of the block maps that have been communicated to the clients,
 an invalidating mechanism configured to use the block map list at the server to invalidate outstanding block maps for the file on other clients if the request to access the file is a write request;
 a granting mechanism configured to grant an exclusive block map to the client that initiated the write request;
 an accessing mechanism that is configured to use information from the block map at the client to access the file on the storage device directly without going through the server, wherein using information from the block map to access the file allows the client to directly access the storage blocks on the storage device; and
 a sending mechanism configured to send all requests associated with the storage device from the client through the server to the storage device via an independent port.

14. The apparatus of claim 13, wherein the block map includes only a portion of the location information for the file.

15. The apparatus of claim 14, further comprising a prefetching mechanism configured to prefetch additional portions of the block map as they are needed.

16. The apparatus of claim 13, wherein the invalidating mechanism is further configured to invalidate the exclusive block map prior to accepting a read request for the file.

17. The apparatus of claim 13, wherein an underlying file system includes a UNIX® file system.

18. The apparatus of claim 17, wherein the underlying file system does not reorder blocks so that the block map remains correct after the block map has been received from the server.

* * * * *